United States Patent
Kato et al.

(10) Patent No.: US 8,839,895 B2
(45) Date of Patent: Sep. 23, 2014

(54) BATTERY SUPPORT STRUCTURE FOR VEHICLE

(75) Inventors: Shingo Kato, Tokyo (JP); Ko Inamura, Tokyo (JP); Narimitsu Yoshii, Tokyo (JP); Takayasu Daikohara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/609,048

(22) Filed: Sep. 10, 2012

(65) Prior Publication Data
US 2013/0075173 A1    Mar. 28, 2013

(30) Foreign Application Priority Data
Sep. 26, 2011   (JP) ................................ 2011-208828

(51) Int. Cl.
*B60R 16/04*      (2006.01)
*H01M 2/10*      (2006.01)
*B60K 1/04*      (2006.01)

(52) U.S. Cl.
CPC ........... *B60K 1/04* (2013.01); *B60K 2001/0438* (2013.01); *Y02E 60/12* (2013.01); *B60R 16/04* (2013.01); *B60Y 2306/01* (2013.01); *H01M 2/1083* (2013.01)
USPC ........................................................ 180/68.5

(58) Field of Classification Search
CPC ...... B60R 16/04; H01M 2/10; H01M 2/1016; H01M 2/1072; H01M 2/1083
USPC ........................................................ 180/68.5
See application file for complete search history.

(56) References Cited

U.S. PATENT DOCUMENTS 5,501,289 A    3/1996   Nishikawa et al.
6,648,090 B2 *   11/2003   Iwase ........................... 180/68.5

FOREIGN PATENT DOCUMENTS

JP         6-261422 A    9/1994
JP        2008-184015 A    8/2008

* cited by examiner

*Primary Examiner* — Jeffrey J Restifo
*Assistant Examiner* — Erez Gurari
(74) *Attorney, Agent, or Firm* — McGinn IP Law Group, PLLC

(57) ABSTRACT

There is provided a battery support structure for a vehicle. The battery support structure for a vehicle includes: a battery pack formed by housing a secondary battery in a case and disposed in a lower part of a vehicle body; and a deformable bracket that supports one end portion of the battery pack in a vehicle width direction. The deformable bracket deforms in response to an input from one end of the battery pack in the vehicle width direction so as to cause the other end of the battery pack to move in an input direction and descend relative to the vehicle body.

8 Claims, 3 Drawing Sheets

BATTERY SUPPORT STRUCTURE FOR VEHICLE

CROSS-REFERENCE TO RELATED APPLICATIONS

The present application claims priority from Japanese Patent Application No. 2011-208828 filed on Sep. 26, 2011, the entire contents of which are hereby incorporated by reference.

BACKGROUND OF THE INVENTION

1. Field of the Invention

The present invention relates to a battery support structure for a vehicle that supports a battery pack in a lower part of a vehicle body, and more particularly to a structure with which both a crashable stroke relative to a side-on collision and a battery loading capacity are secured.

2. Description of the Related Art

A large amount of secondary batteries such as lithium ion batteries or nickel hydrogen batteries must be loaded in an electric vehicle such as an engine-electric hybrid vehicle, a plug-in hybrid vehicle, or an electric automobile.

The batteries are loaded in the vehicle in the form of a battery pack in which a plurality of battery cells are housed in a case.

Among respective constituent components of the vehicle, the battery pack has a comparatively large weight, and it has therefore been proposed that the battery pack be loaded in an interval between left and right side frames on a lower side of a floor panel forming a floor surface of a passenger compartment in order to lower a center of gravity position of the vehicle and thereby secure a favorable traveling performance and so on.

Japanese Unexamined Patent Application Publication (JP-A) No. H6-261422, for example, describes an electric automobile in which a battery pack is loaded in a region between left and right side frames of a lower part of a vehicle body under a floor panel.

In this type of battery pack, it is necessary to ensure that the case is not crushed even when the vehicle crashes in order to protect the battery cells.

As related art pertaining to a battery loading structure designed in consideration of a side-on collision, JP-A No. 2008-184015, for example, describes interposing a bracket between upper stage batteries and lower stage batteries so that the bracket can be restored in a flattening direction by the weight of the upper stage batteries.

When taking the performance of the vehicle during a side-on collision into consideration, it is important to secure a crashable stroke by causing the vehicle body to deform such that the side frame is pushed inward in a vehicle width direction, thereby absorbing energy.

When a clearance between the battery pack and the side frame is increased to secure an allowable amount of lateral direction displacement in the side frame, a maximum loadable capacity of the battery pack decreases, making it difficult to secure a battery capacity required to obtain a favorable performance in the vehicle.

In a case where it is difficult to secure a sufficient crashable stroke, the strength of components such as the side frames and side sills must be increased in order to absorb an input load, leading to increases in weight and cost and reductions in fuel efficiency and drivability.

SUMMARY OF THE INVENTION

In consideration of the problems described above, an object of the present invention is to provide a battery support structure for a vehicle with which both a crashable stroke relative to a side-on collision and a battery loading capacity are secured.

An aspect of the present invention provides a battery support structure for a vehicle The battery support structure for a vehicle includes: a battery pack formed by housing a secondary battery in a case and disposed in a lower part of a vehicle body; and a deformable bracket that supports one end of the battery pack in a vehicle width direction. The deformable bracket deforms in response to an input from one end of the battery pack in the vehicle width direction so as to cause the other end of the battery pack to move in an input direction and descend relative to the vehicle body.

The other end of the battery pack is thus supported to be capable of moving in the input direction, and therefore the battery pack can be moved in the vehicle width direction as the vehicle body displaces in response to an input in the vehicle width direction from the one end. As a result, a crashable stroke can be secured.

Accordingly, a width of the battery pack can be increased in comparison with a case where the present invention is not applied, and therefore an up-down direction dimension of the battery pack need not be increased to secure the battery pack loading capacity.

Further, by causing the other end of the battery pack to descend at this time, interference with other components accompanying movement in the vehicle width direction can be prevented.

Preferably, the deformable bracket includes a rotating unit having a vehicle body side end coupled to the vehicle body and a battery side end coupled to the battery pack on either end thereof, the vehicle body side end prior to a collision is disposed in a higher position than the battery side end and a position that is removed from the battery pack in the vehicle width direction, and the rotating unit rotates in response to an input acting on the battery pack in the vehicle width direction such that the battery side end descends and moves in the vehicle width direction substantially in alignment with a direction of the input.

Thus, the effects described above can be obtained reliably with a simple configuration.

Preferably, the deformable bracket is constructed by forming the rotating unit integrally with a fixing member fixing the rotating unit to the vehicle body or the battery pack, and the rotating unit rotates when a location thereof coupled to the fixing member bends.

Thus, the effects described above can be obtained with a simple configuration having a small number of components.

Preferably, the battery pack includes a first end disposed adjacent to a side frame of the vehicle and a second end disposed on a vehicle center side relative to the first end, and the deformable bracket supports the second end.

By causing the battery pack to move toward the vehicle body center side (a floor tunnel side) when a side-on collision occurs in the vehicle, a crashable stroke that allows the side frame to move can be secured.

BRIEF DESCRIPTION OF THE DRAWINGS

FIG. 3 is an enlarged view of a region III in FIG. 2, wherein FIG. 3A shows a condition prior to a collision and FIG. 3B shows a condition during a collision.

DESCRIPTION OF THE PREFERRED EMBODIMENTS

The present invention solves the problem of providing a battery support structure for a vehicle with which both a crashable stroke relative to a side-on collision and a battery loading capacity are secured by supporting a vehicle width direction inner side of a battery pack using a deformable bracket that deforms during a collision, thereby allowing the battery pack to move inward in the vehicle width direction and descend relative to a vehicle body.

EXAMPLE

An example of a battery support structure for a vehicle to which the present invention is applied will be described below.

The battery support structure for a vehicle according to this example is used to support a battery pack under a floor of a passenger vehicle constituted by a gasoline engine-electric hybrid vehicle, for example.

Figure 1:
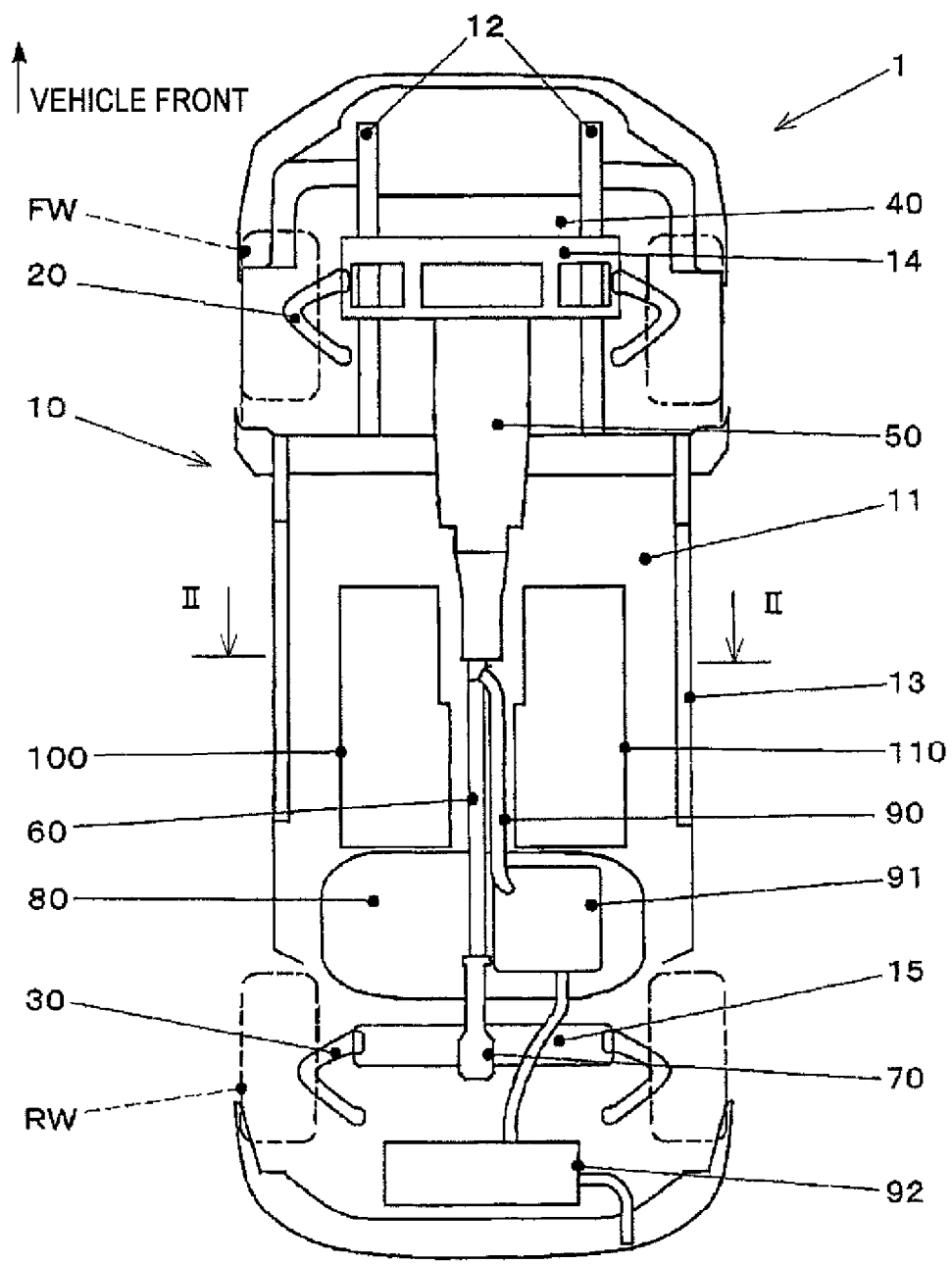
FIG. 1 is a schematic plan view showing a vehicle including an embodiment of a battery support structure for a vehicle to which the present invention is applied from an under floor side.

FIG. 1 is a schematic plan view showing a vehicle including an embodiment of a battery support structure for a vehicle to which the present invention is applied from an under floor side.

Figure 2:
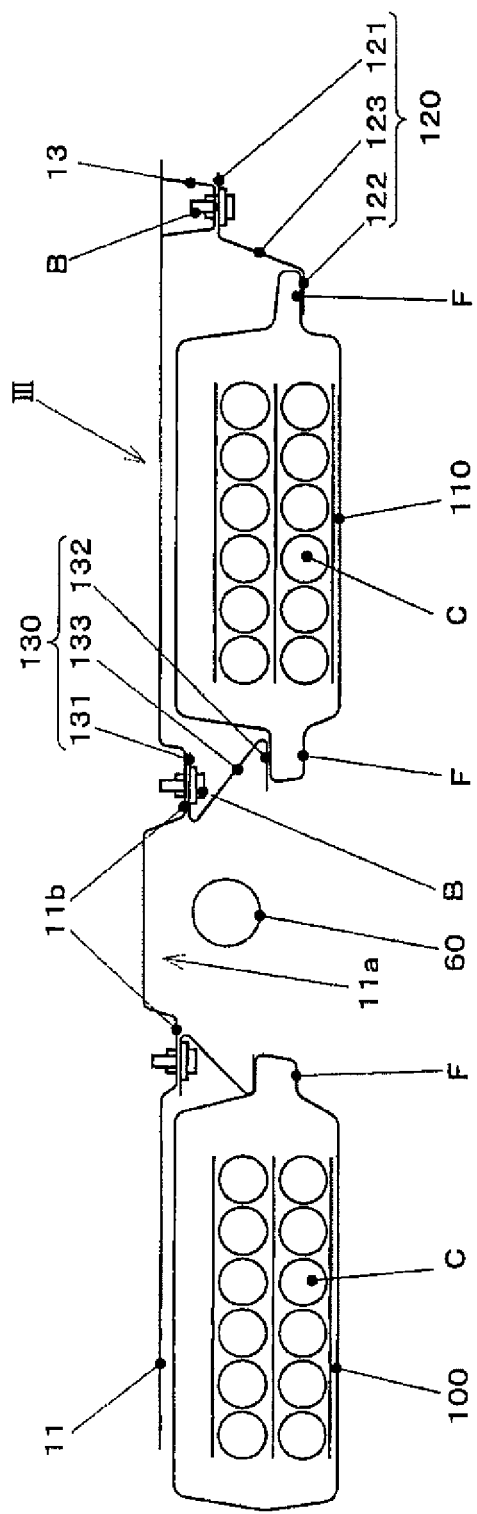
FIG. 2 is a sectional view seen from arrows of a region in FIG. 1.

FIG. 2 is a sectional view seen from arrows of a region II-II in FIG. 1.

A vehicle 1 is a four-wheel passenger vehicle having respective left-right pairs of front wheels FW and rear wheels RW.

The vehicle 1 includes a vehicle body 10, a front suspension 20, a rear suspension 30, an engine 40, a transmission 50, a propeller shaft 60, a rear differential 70, a fuel tank 80, an exhaust pipe 90, a right battery pack 100, a left battery pack 110, and so on.

The vehicle body 10 includes a floor panel 11, a front frame 12, a side frame 13, a front sub-frame 14, a rear sub-frame 15, and so on.

The floor panel 11 is a member constituting a floor surface of a cabin for carrying passengers and the like, which is formed to be substantially flat plate-shaped and disposed substantially horizontally.

A floor tunnel 11a serving as a recessed area housing the propeller shaft and the exhaust pipe is formed in a central area of the floor panel 11 in the vehicle width direction so as to extend in a front-rear direction.

Further, as shown in FIG. 2, a projecting area 11b is provided on each of the left and right sides of the floor tunnel 11a, and brackets from which the left battery pack 100 and the right battery pack 110 are suspended, as will be described below, are fixed to the projecting area 11b.

The projecting area 11b is formed by causing a part of the floor panel 11 to jut downward.

The front frame 12 is a structural member formed to extend from a front end of the floor panel 11 to a front side of the vehicle.

The front frame 12 is formed in a joist shape having a rectangular closed cross-section, for example.

The front frame 12 is provided in a pair separated in the vehicle width direction.

The side frame 13 is a joist-shaped member having a closed cross-section, which is provided on either end of the floor panel 11 to extend in the front-rear direction of the vehicle.

The front sub-frame 14 is a frame-shaped structural member provided across a lower part of the left and right front frames 12, and serves as a base to which the front suspension 20, the engine 40, and so on are attached.

The rear sub-frame 15 is a frame-shaped structural member provided on a lower rear part of a vehicle, and serves as a base to which the rear suspension 30, the rear differential 70, and so on are attached.

The front suspension 20 is used to support a hub bearing, which supports the front wheels FW rotatably, to be capable of stroking relative to the vehicle body.

The front suspension 20 includes a housing that houses the hub bearing, a suspension arm that couples the housing to the front sub-frame 14, a suspension spring and a damper that generate a spring reaction force and a damping force in accordance with a stroke, and so on.

The rear suspension 30 is used to support a hub bearing, which supports the rear wheels RW rotatably, to be capable of stroking relative to the vehicle body.

The rear suspension 30 includes a housing that houses the hub bearing, a suspension arm that couples the housing to the rear sub-frame 15, a suspension spring and a damper that generate a spring reaction force and a damping force in accordance with the stroke, and so on.

The engine 40 is a horizontally opposed four-cylinder gasoline engine, for example, that serves as a travel power source of the vehicle 1.

The engine 40 is loaded longitudinally between the left and right front frames 12 and mounted on an upper portion of the front sub-frame 14.

The transmission 50 shifts and outputs an output of the engine 40.

Further, the transmission 50 includes a motor/generator that performs regenerative power generation during braking, driving assistance during acceleration, and so on, an AWD transfer that distributes driving force to the front and rear wheel sides, a final reduction gear and a front differential that transmit the driving force to the left and right front wheels, and so on.

The transmission 50 is joined to a rear end of the engine 40 and disposed in the floor tunnel 11a on a front side.

The propeller shaft 60 is a power transmission shaft provided between a rear end of the transmission 50 and a front end of the rear differential 70 in order to transmit a rear wheel side output of the transmission 50 to the rear differential 70.

The rear differential 70 is used to reduce a rotation of the propeller shaft 60 and transmit the reduced rotation to the left and right rear wheels RW, and includes a final reduction gear, a rear differential, and so on.

The fuel tank 80 is a container for storing gasoline or the like, for example, serving as a fuel of the engine 40, and is disposed under the floor panel 11 on a front side of the rear sub-frame 15.

The exhaust pipe 90 is used to discharge burned gas (exhaust gas) discharged from the engine 40 to the exterior of the vehicle, and is disposed to extend from the interior of the floor tunnel 11a under the fuel tank 80 to a rear end of the vehicle.

A catalytic converter 91 and a silencer 92 are provided in an intermediate area of the exhaust pipe 90 in order from an upstream side.

The catalytic converter 91 includes a three-way catalyst that purifies HC, NOx, and CO contained in the exhaust gas, for example. The catalytic converter 91 is disposed so as to be housed in a recessed area formed in a lower part of the fuel tank 80, for example.

The silencer 92 is used to reduce noise by reducing an acoustic energy of the exhaust gas. The silencer 92 is disposed on an under floor side of the vehicle rear end to the rear of the rear sub-frame 15, for example.

The right battery pack 100 and the left battery pack 110 store power generated by the motor/generator during regenerative power generation, and supply power for driving the motor/generator.

The right battery pack 100 and the left battery pack 110 are formed by housing a plurality of battery cells C in a metal case, for example.

As shown in FIG. 2, the right battery pack 100 and the left battery pack 110 have a substantially rectangular cross-sectional shape when seen from the vehicle front-rear direction, and respectively include flanges F that project in a horizontal direction from both vehicle width direction ends in an intermediate height direction position (the flange on a vehicle width direction outer side of the right battery pack 100 is not shown in the drawing).

Respective upper surfaces of the right battery pack 100 and the left battery pack 110 are disposed to face a lower surface of the floor panel 11 via a predetermined interval.

The right battery pack 100 and the left battery pack 110 are supported by suspending the flanges F from brackets.

A support structure for the left battery pack 110 will be described below as a representative example.

Note that the right battery pack 100 is supported by a support structure that is substantially left-right symmetrical to the support structure of the left battery pack 110.

As shown in FIG. 2, the left battery pack 110 is suspended from an outside bracket 120 and an inside bracket 130.

The outside bracket 120 is used to support a vehicle width direction outer side (side frame 13 side) end of the left battery pack 110.

The outside bracket 120 includes a vehicle body side fixing member 121, a battery side fixing member 122, a coupler 123, and so on.

The vehicle body side fixing member 121 is a part fixed to a lower surface of the side frame 13. The vehicle body side fixing member 121 is formed in a flat plate shape and disposed substantially horizontally.

The vehicle body side fixing member 121 is fixed by fastening a bolt B to a weld nut fixed to the side frame 13, for example.

The battery side fixing member 122 is a part fixed to a lower surface of the vehicle width direction outer side flange F of the left battery pack 110. The battery side fixing member 122 is formed in a flat plate shape and disposed substantially horizontally.

The coupler 123 is a part for coupling a vehicle width direction inner side end of the vehicle body side fixing member 121 to a vehicle width direction outer side end of the battery side fixing member 122.

A vehicle body side fixing member 121 side end of the coupler 123 is disposed above and on the vehicle width direction outer side of a battery side fixing member 122 side end portion.

The vehicle body side fixing member 121, battery side fixing member 122, and coupler 123 are formed integrally by bending strip-form sheet metal, for example.

The inside bracket 130 is used to support a vehicle width direction inner side (floor tunnel 11*a* side) end of the left battery pack 110.

The inside bracket 130 functions as a deformable bracket according to the present invention, which deforms when a side-on collision occurs in the vehicle so as to allow the left battery pack 130 to descend while moving inward in the vehicle width direction.

The inside bracket 130 includes a vehicle body side fixing member 131, a battery side fixing member 132, a connecting member 133, and so on.

The vehicle body side fixing member 131 is a part fixed to the projector 11*b* of the floor panel 11. The vehicle body side fixing member 131 is formed in a flat plate shape and disposed substantially horizontally.

The vehicle body side fixing member 131 is fixed by fastening a bolt B to a weld nut fixed to the projector 11*b*, for example.

The battery side fixing member 132 is a member fixed to an upper surface of the vehicle width direction inner side flange F of the left battery pack 110. The battery side fixing member 132 is formed in a flat plate shape and disposed substantially horizontally.

The connecting member 133 is a part for coupling a vehicle width direction inner side end of the vehicle body side fixing member 131 to a vehicle width direction outer side end of the battery side fixing member.

A vehicle body side fixing member 131 side end of the connecting member 133 is disposed above and on the vehicle width direction inner side of a battery side fixing member 132 side end.

The connecting member 133 functions as a rotating unit that rotates when a side-on collision occurs in the vehicle so as to cause the vehicle width direction inner side end of the left battery pack 110 to descend while moving inward in the vehicle width direction.

The vehicle body side fixing member 131, battery side fixing member 132, and connecting member 133 are formed integrally by bending strip-form sheet metal, for example.

An operation performed during a collision according to this example will now be described.

Figure 3:
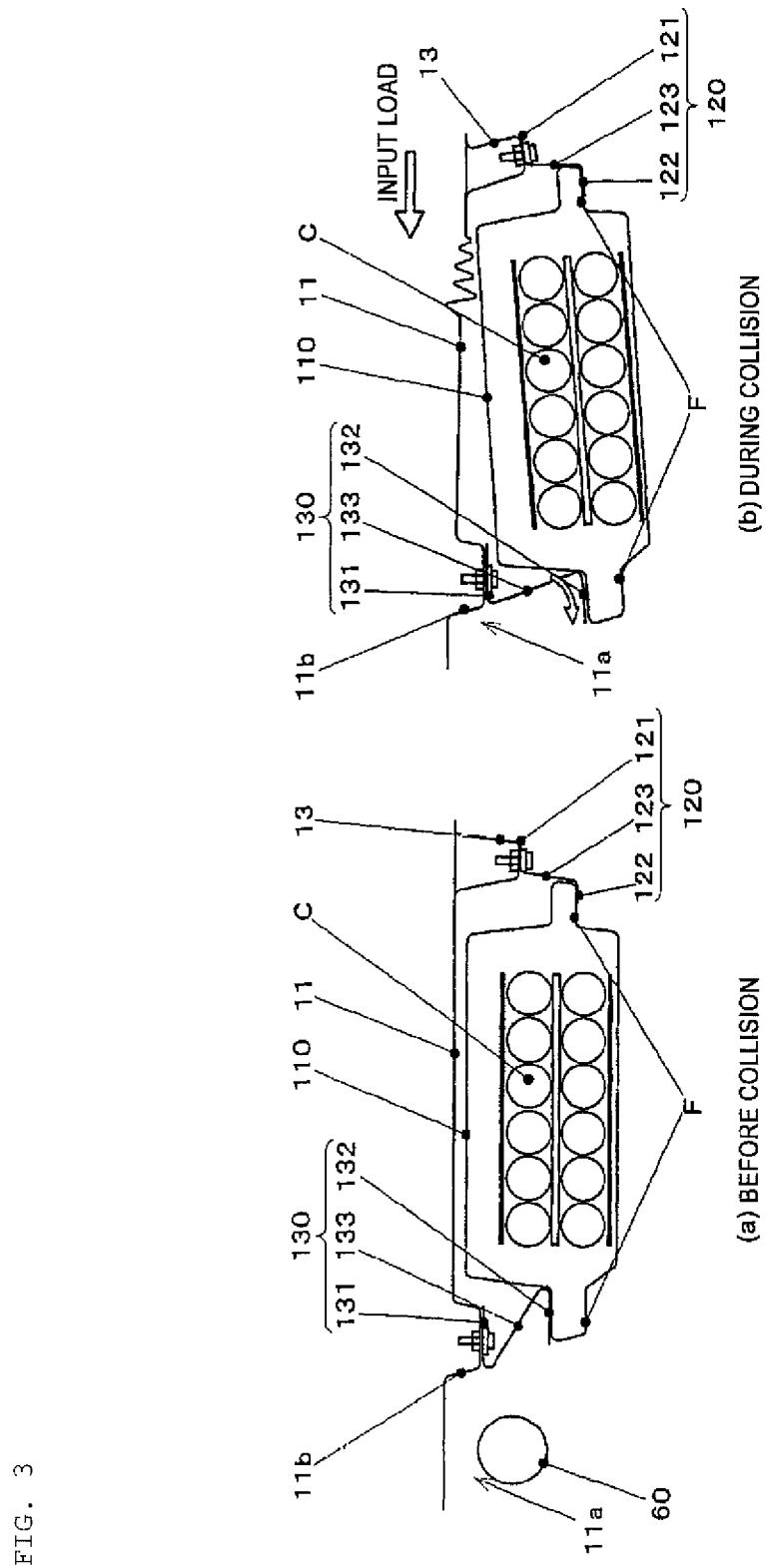

FIG. 3 is an enlarged view of a region III in FIG. 2, wherein FIG. 3A shows a condition prior to a collision and FIG. 3B shows a condition during a collision.

As shown in FIG. 3B, when a side-on collision occurs such that an input is received in a direction for pushing the side frame 13 inward in the vehicle width direction, the side frame 13 moves to the floor tunnel 11*a* side while a region of the floor panel 11 adjacent to the side frame 13 deforms.

As the side frame 13 moves, the left battery pack 110 is pushed against the outside bracket 120 so as to displace inward in the vehicle width direction.

At this time, plastic deformation occurs in an area of the connecting member 133 of the inside bracket 130 that connects the vehicle body side fixing member 131 to the battery side fixing member 132, and as a result, the connecting member 133 rotates about the vehicle body side fixing member 131 side end such that the battery side fixing member 132 side end descends relative to the vehicle body 10 while displacing inward in the vehicle width direction.

The vehicle width direction inner side end of the left battery pack 110 descends while displacing inward in the vehicle width direction together with the battery side fixing member 132 of the inside bracket 130, and is therefore prevented from colliding with other components and the like.

As described above, according to this example, by supporting the vehicle width direction inner side end of the battery pack using the inside bracket having the coupler that is capable of rotating so as to cause the vehicle width direction inner side end to descend while displacing inward in the vehicle width direction, the battery pack can be moved inward in the vehicle width direction as the vehicle body deforms in response to an input from the vehicle width direction outer side generated during a side-on collision. As a result, a crashable stroke can be secured.

Further, by causing the vehicle width direction inner side end of the battery pack to descend, the battery pack can be prevented from colliding with other components such as the propeller shaft. As a result, a situation in which the battery pack is damaged by being sandwiched between other components can be prevented.

Furthermore, the effects described above are obtained using the integral inside bracket, which is constructed by forming vehicle body side and battery side couplers at the respective ends of the rotating unit (the coupler), and therefore an increase in a number of components can be suppressed and structural simplicity can be achieved.

MODIFIED EXAMPLES

The present invention is not limited to the example described above and may be subjected to various amendments and modifications, which belong to the technical scope of the present invention.

(1) Shapes, structures, arrangements, materials, manufacturing methods, and so on of the respective members constituting the battery pack support structure for a vehicle are not limited to those described in the above example and may be modified appropriately.

(2) In the above example, the battery packs are loaded on the left and right sides of the floor tunnel, but a battery may be loaded in a central area of the vehicle body. In this case, left and right ends are supported by brackets having a rotating unit such that when a side-on collision occurs, the battery pack can be moved by the rotating unit of the bracket on an opposite side to an input side.

(3) The vehicle according to the above example is an engine-electric hybrid vehicle, for example, but the present invention is not limited thereto and may also be applied to a plug-in hybrid vehicle that can be charged from a power supply facility or another type of electric vehicle such as an electric automobile that obtains travel power from a motor alone.

What is claimed is:

1. A battery support structure for a vehicle, comprising:
a battery pack formed by housing a secondary battery in a case and disposed below a floor panel of a vehicle body; and
a deformable bracket for supporting at least one end of the battery pack in a vehicle width direction,
wherein the deformable bracket deforms in response to an input in the vehicle width direction so as to cause the one end of the battery pack to move in an input direction and descend relative to the floor panel of the vehicle body.

2. The battery support structure for a vehicle according to claim 1, wherein
the deformable bracket includes a rotating unit having a vehicle body side end coupled to the vehicle body and a battery side end coupled to the battery pack on either end thereof,
prior to a collision, the vehicle body side end is disposed in a higher position than the battery side end and a position that is removed from the battery pack in the vehicle width direction, and
the rotating unit rotates in response to an input acting on the battery pack in the vehicle width direction such that the battery side end descends and moves in the vehicle width direction substantially in alignment with a direction of the input.

3. The battery support structure for a vehicle according to claim 2, wherein
the deformable bracket is constructed by forming the rotating unit integrally with a fixing member fixing the rotating unit to the vehicle body or the battery pack, and
the rotating unit rotates when a location thereof coupled to the fixing member bends.

4. The battery support structure for a vehicle according to claim 1, wherein
the battery pack comprises a first end disposed adjacent to a side frame of the vehicle and a second end disposed on a vehicle center side relative to the first end, and
the deformable bracket supports the second end.

5. The battery support structure for a vehicle according to claim 2, wherein
the battery pack comprises a first end disposed adjacent to a side frame of the vehicle and a second end disposed on a vehicle center side relative to the first end, and
the deformable bracket supports the second end.

6. The battery support structure for a vehicle according to claim 3, wherein
the battery pack comprises a first end disposed adjacent to a side frame of the vehicle and a second end disposed on a vehicle center side relative to the first end, and
the deformable bracket supports the second end.

7. A battery support structure for a vehicle, comprising:
a battery pack formed by housing a secondary battery in a case and disposed below a lower surface of a floor panel of a vehicle body; and
a deformable bracket including a rotating unit for supporting one end of the battery pack, the rotating unit having a vehicle body side end coupled to the vehicle body and a battery side end coupled to the battery pack on each end thereof,
wherein, prior to a collision, the vehicle body side end is disposed in a higher position than the battery side end and a position that is removed from the battery pack in a vehicle width direction, and
wherein the rotating unit rotates in response to an input acting on the battery pack in the vehicle width direction such that the battery side end descends away from the floor panel and moves in the vehicle width direction substantially in alignment with a direction of the input.

8. A battery support structure for a vehicle, comprising:
a battery pack formed by housing a secondary battery in a case and disposed in a lower part of a vehicle body; and
a deformable bracket for supporting one end of the battery pack in a vehicle width direction,
wherein the deformable bracket deforms in response to an input from one end of the battery pack in the vehicle width direction so as to cause the other end of the battery pack to move in an input direction and descend relative to the vehicle body,
wherein the deformable bracket includes a rotating unit having a vehicle body side end coupled to the vehicle body and a battery side end coupled to the battery pack on either end thereof,
wherein, prior to a collision, the vehicle body side end is disposed in a higher position than the battery side end and a position that is removed from the battery pack in the vehicle width direction, and
wherein the rotating unit rotates in response to an input acting on the battery pack in the vehicle width direction such that the battery side end descends and moves in the vehicle width direction substantially in alignment with a direction of the input.

* * * * *